Jan. 13, 1970     E. W. THRASHER     3,489,189

SELF-CLEANING SAW GUIDE

Filed Nov. 13, 1967     4 Sheets-Sheet 1

INVENTOR.
ELBRIDGE W. THRASHER
BY *Eckhoff and Hoppe*
ATTORNEYS

INVENTOR.
ELBRIDGE W. THRASHER
BY Eckhoff and Hoppe
ATTORNEYS

Jan. 13, 1970   E. W. THRASHER   3,489,189
SELF-CLEANING SAW GUIDE
Filed Nov. 13, 1967   4 Sheets-Sheet 3
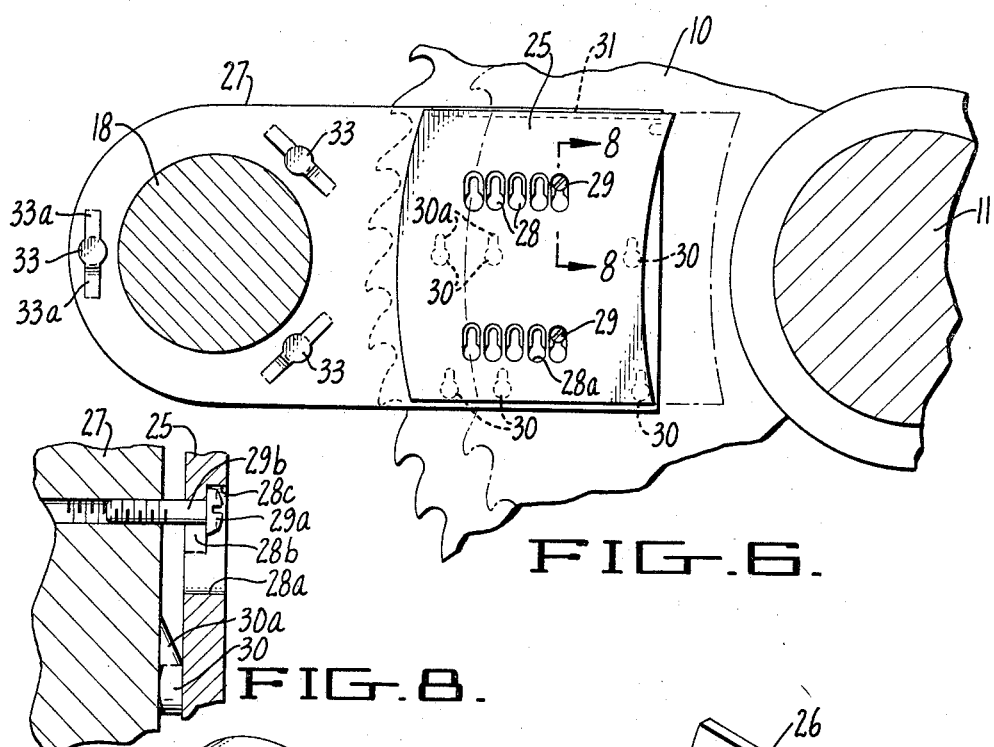
FIG. 6.
FIG. 8.
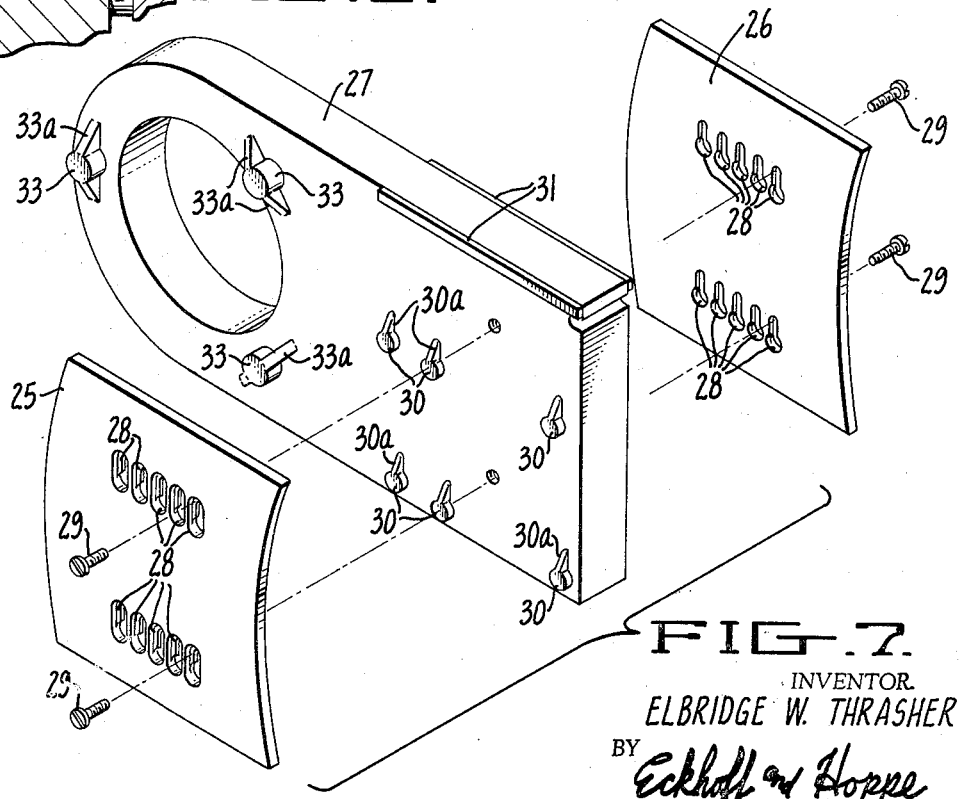
FIG. 7.
INVENTOR.
ELBRIDGE W. THRASHER
BY Eckhoff and Hoppe
ATTORNEYS INVENTOR.
ELBRIDGE W. THRASHER
BY Eckhoff and Hoppe
ATTORNEYS

United States Patent Office 3,489,189
Patented Jan. 13, 1970

3,489,189
SELF-CLEANING SAW GUIDE
Elbridge W. Thrasher, Ukiah, Calif., assignor to Masonite Corporation, a corporation of Delaware
Filed Nov. 13, 1967, Ser. No. 682,122
Int. Cl. B27b 11/02
U.S. Cl. 143—160                                19 Claims

ABSTRACT OF THE DISCLOSURE

A saw guide comprising a pair of support arms located on opposite sides of a saw blade and having replaceable wear guides supported upon each arm, respectively, the improvements wherein means are provided on each support arm for supporting wear guides as to facilitate the removal of sawdust from the work area, wherein other contact means are provided to maintain a uniform spacing between support arms and yet permit relative axial movement to remove sawdust and to implement the replacement of wear guides, and further wherein the wear guides may be selectively positioned on their support arms to establish and maintain contacts near the gullet lines of saw blades of different sizes.

---

This invention relates generally to saw guides and more particularly involves improvements for removing sawdust from the work area, for replacing worn saw guides and for maintaining contacts near the gullet lines of saw blades.

The invention more particularly involves improvements in saw guide apparatus, especially of the commercial type described in United States Letters Patent No. 3,285,302. That patent teaches and explains how saw guides, including replaceable wear guides, may be used for controlling the cuting action of unusually thin saw blades to obtain a larger recovery of usable lumber than possible with more conventional apparatus.

One of the problems solved by the present invention is that the earlier construction of saw guides (described in the aforementioned patent) allowed a buildup of sawdust between the supported wear guide and the lateral backing face of its support arm. Inasmuch as the buildup of sawdust over a period of time would force the loosely supported wear guides away from their support arms and since the sawdust did not necessarily accumulate at the same rate between all support arms and wear guides, variations in spacing between guiding surfaces sometimes resulted. Moreover, the accumulation of sawdust eliminated the clearance between the saw blades and guides, causing a heating of the blades. These undesirable results, it has been found, can be eliminated by providing a plurality of contacts on the support arms which cooperate in a manner to inhibit the buildup of sawdust. Certain of these contacts are also useful to implement periodic replacement of wear guides.

The present invention also solves a problem which has been experienced in maintaining wear contacts near the gullet line of the saw blades. That problem is created by the fact that resharpened blades are smaller in diameter at the gullet line than when new. Therefore, using applicant's prior method for mounting wear guides upon support arms, it was necessary to reshape existing wear guides or provide wear guides of various shapes for use with resharpened saw blades or blades of different diameters. The present invention, however, solves this problem by providing novel forms of wear guides and mounting means that permit selective adjustment of replaceable wear guides. This feature of the invention allows wear guides of predetermined shape and thickness to be used for both used saws that have been repeatedly resharpened as well as new saw blades of various sizes.

In brief, the improvements contemplated by the present invention involve an arrangement of contacts and mounting means which facilitate the removal of sawdust, the replacement of worn wear guides and the maintenance of guiding contacts near the gullet lines of saw blades.

One object of the present invention is to provide saw guide apparatus of the kind described including wear guide contacts that provide a continuous line of contact across the upper end of a wear guide to inhibit the passage of sawdust from regions above the wear guide into a region below and between the support arm and wear guide.

Another object of the invention is to provide a plurality of contacts mounted on the support arms, each contact providing a relatively small area of contact with the wear guide as compared with larger areas of space between the contacts.

Another object is to provide contacts upon the support arms which are formed with inclined surfaces that extend in the direction for mounting the wear guide to its support arm, thereby enhancing the removal and replacement of wear guides.

A further object of the invention is to provide contacts on pivotally mounted support arms, said contacts being arranged to engage the contacts of adjacent support arms when both support arms occupy saw guiding positions, but wherein a pivotal movement of one support arm will result in a misalignment of contacts that permits relative axial movement of one support arm toward and away from an adjacent support arm.

A still further object is to provide surface contacts of the kind described mounted to the hub of a pivotally mounted support arm, said contacts having inclined surfaces extending outward from the face of the hub in a generally circumferential direction relative to the pivot axis, each inclined surface cooperating with the abutting contact of an adjacent arm and providing an engagement for moving support arms relatively apart and imparting a shearing action to remove any sawdust that may adhere to the abutting contact surfaces.

And yet another object of the invention is to provide means for selectively mounting wear guides to establish and maintain points of contact near the gullet lines of saw blades of different sizes.

Other objects of this invention will become apparent in view of the following detailed description.

In the drawings forming a part of this application and in which like parts are identified by like reference numerals throughout the same, FIG. 1 is a schematic section of a battery edger equipped with saw guides for controlling lateral deviation and more particularly constructed in a preferred manner contemplated by this invention;

FIG. 6 is a second preferred embodiment of the invention in saw guides, showing the same in side elevation;

FIG. 7 is a perspective view of the saw guide support arm and wear guides of FIG. 6, the wear guides being shown in exploded relation to the support arm;

FIG. 8 is an enlarged section taken on line 8—8 of FIG. 6;

Figure 1:
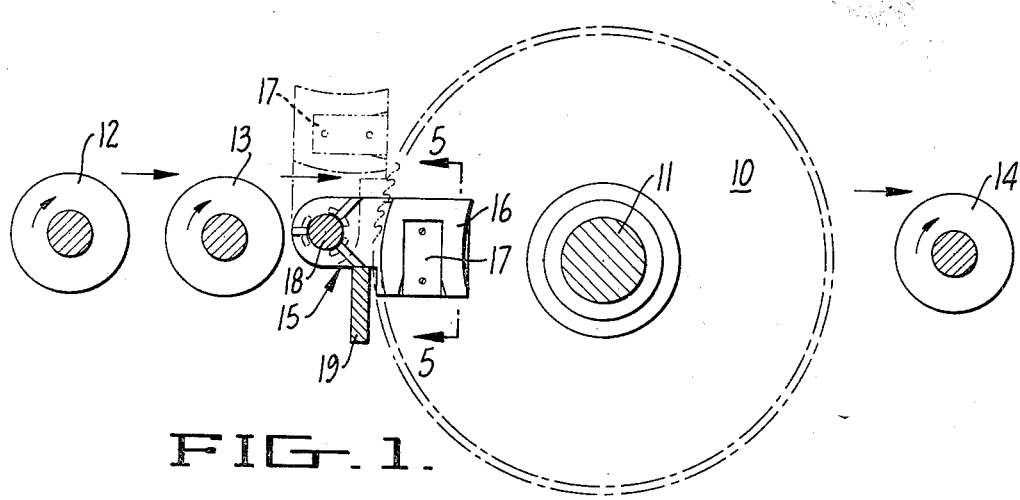
Figure 2:
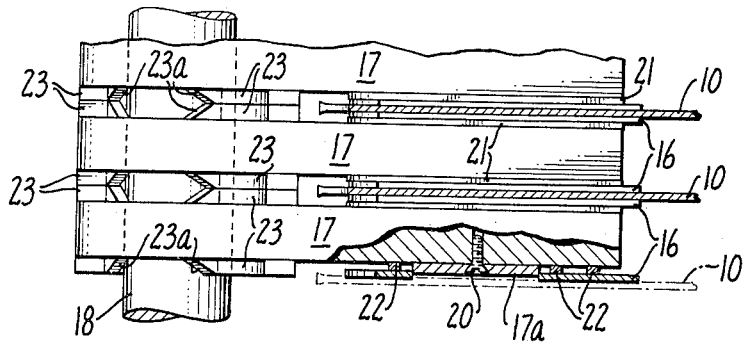
FIG. 2 is an enlarged plan view of a portion of the battery edger shown in FIG. 1, illustrating certain details of the saw guide support arms.
Figure 3:
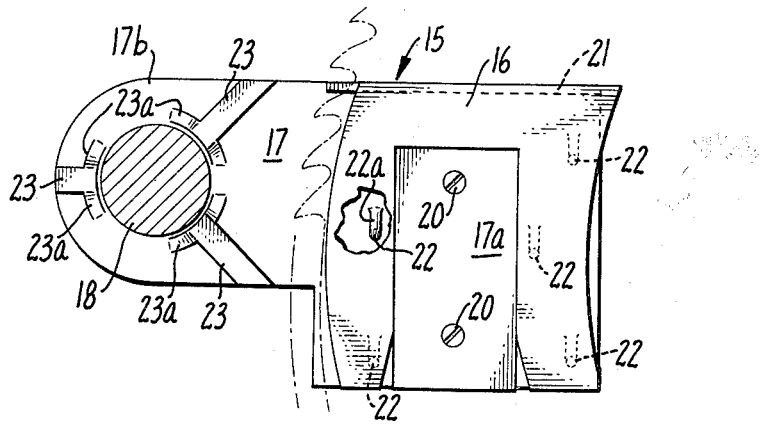
FIG. 3 is an enlarged detail and side elevation of the saw guide shown in FIG. 1.
Figure 4:
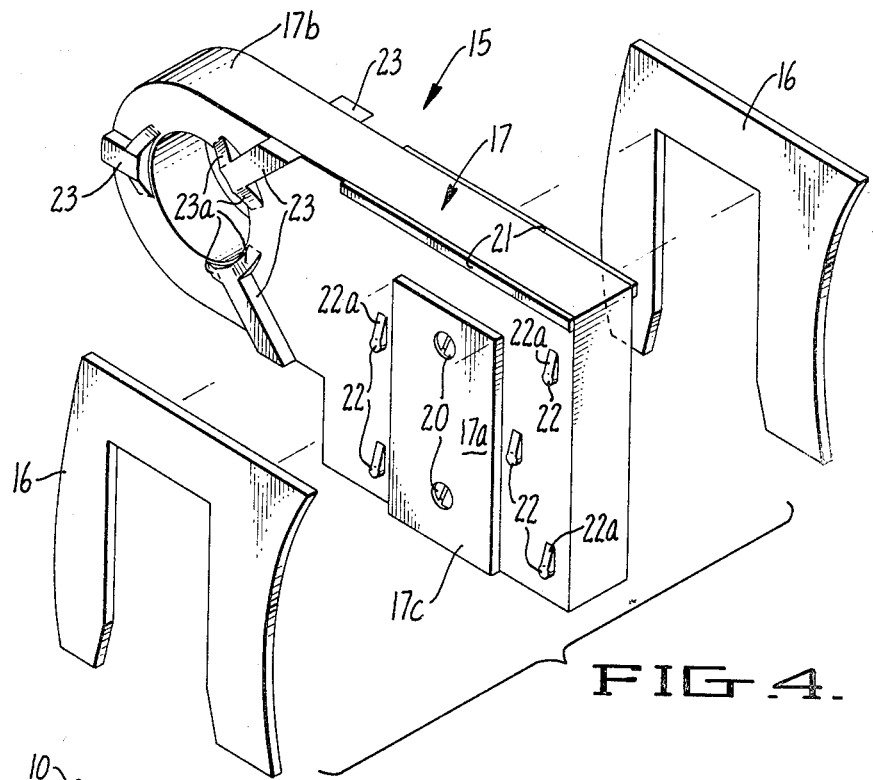
FIG. 4 is a perspective view of a saw guide support arm showing the wear guides normally supported thereon in exploded relation thereto.
Figure 5:
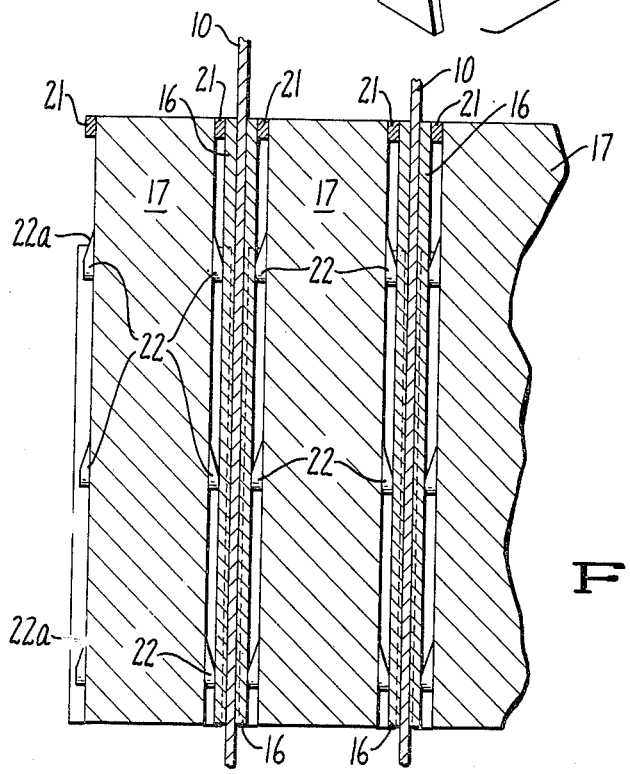
FIG. 5 is a vertical section taken on line 5—5 of FIG. 1, illustrating a portion of the battery edger including the wear guides and arm supports for a pair of circular saw blades.

Referring to FIG. 1, there is schematically shown a battery edger machine comprising a battery of circular saw blades 10 mounted on an arbor 11 and having a plurality of rollers 12, 13 and 14 for moving cants or fliches into and through the battery of blades. Each saw blade 10 is axially movable along arbor 11 with a floating looseness thereon. The lateral position of the saws upon the arbor is controlled by a plurality of saw guides, indicated generally by the reference number 15 and including replaceable wear guides 16. The arrangement of saw blades and the manner of their operation, including the control exerted by the saw guides, is essentially the same as that taught in United States Letters Patent No. 3,285,302. It is to be understood, therefore, that the present invention more particularly relates to improvements in the saw guide to facilitate the removal of sawdust from the work area, to implement the replacement of worn wear guides and to permit wear guides of predetermined shape and thickness to be used on both used and new saw blades of various sizes.

Saw guides 15 essentially comprise a plurality of support arms 17 pivotally mounted upon a fixed shaft 18, each arm being pivotally mounted in a plane parallel to saws 10 and arranged for interdigitation with the battery of saws. A stop bar 19 supports each of the arms 17 in their saw guiding positions, as shown by the solid lines in FIG. 1. However, each arm may be pivoted away from stop arm 19 into the broken line position shown, thus permitting saws 10 to be shifted and respaced axially along support arbor 11. A pair of wear guide support plates 17a are mounted on opposite sides of each arm by a pair of cap screws 20, each plate being of a thickness sufficient to support a wear guide mounted thereon but insufficient to make contact with saw blades 10.

Referring to FIGS. 2 through 5 in particular, a plurality of contacts provided on support arms 17 maintain a supported wear guide in spaced relation to its supporting arm. In this connection a wear guide contact strip 21 and a plurality of other wear guide contacts 22 project outwardly from the lateral face of each support arm. Contacts 20 and 21, in effect, define a backing surface for holding wear guide 16 in close proximity to the adjacent saw blade while simultaneously providing a passageway between the contacts through which sawdust may gravitate from the work area. Wear contact strip 20, it will be noted, provides an essentially continuous line of contact across the upper end of wear guide 16, and each contact 22 provides a relatively small area of contact compared with the much greater areas of space between contacts. Such an arrangement of contacts, it has been found, inhibits the passage of sawdust from a region above the wear guide into the region below. It also facilitates the movement of sawdust through the passageway between contacts, thereby preventing a buildup of sawdust between the wear guides and their respective support arms.

One preferred form of contact 22 has an inclined surface 22a that extends in the direction for mounting the wear guide to its support arm. Inclined surfaces 22a allow wear guides 16 to be replaced without encountering obstructing surfaces. In effect, surfaces 22a tend to cam or move the replacement wear guide in the direction of the saw as it is moved downward.

The invention further contemplates providing a plurality of contacts 23 mounted on the hub 17b of each support arm 17. Contacts 23 project laterally from the faces of the hub and they are arranged to engage the contacts of an adjacent support arm when both arms occupy saw guiding positions. The combined lateral projection of abutting contacts on adjacent arms establish the required spacing for positioning the wear guides in close proximity to the saw blades. The preferred embodiment shown illustrates the use of three contacts on each side of a hub, each contact being spaced approximately an equal angular distance apart.

It will be evident that a pivotal movement of one support arm from a saw guiding position and into a position such as indicated by the broken line position of FIG. 1 will result in a misalignment of contacts relative to the contacts of adjacent support arms. This allows the pivoted arm to be moved axially upon the support shaft 18. A movement of this type will dislodge any sawdust that may have collected in the region of the hub of adjacent support arms. In addition, the ability to move a support arm axially enhances the replacement of wear guides since the arms may be moved to increase the lateral spacing between support arms.

Contacts 23 include inclined surfaces 23a which extend outwardly from the face of the hubs in generally circumferential directions. It will be apparent that two inclined, facing surfaces of adjacent support arms cooperate to implement the alignment of contacts while one or both of two adjacent support arms are pivoted into saw guiding positions. For example, in the event that one support arm is pivotally retracted from its saw guiding position (as in the act of cleaning sawdust from the work area or replacing saw guides) and if the support arm becomes axially positioned more closely to the adjacent arm than is their normal spacing, then pivoting the support arm back to a saw guiding position will first produce an engagement between inclined surfaces 23a. Continued movement of the arm will cam the support arms apart to establish an alignment of contacts without obstruction. Furthermore, a shearing action is produced between abutting surfaces 23a, thereby removing any sawdust that may adhere thereto.

FIGS. 6, 7 and 8 of the drawings illustrate a second preferred embodiment of the invention that prevents replaceable wear guides of predetermined shape and thickness to be selectively mounted upon support arms for maintaining contacts near the gullet line of both used saws of varying diameter and new saws of various sizes. In this embodiment of the invention, a pair of replaceable wear guides 25 and 26 are mounted upon support arm 27. Each wear guide is formed with two complementary rows of slots 28 from which the wear guide is supported upon a pair of screws or support members 29, each member being secured to and projecting from one side of support arm 27. The two rows of slots 28 are spaced apart and arranged so that one slot of each row may be simultaneously engaged with one support member 29, respectively; and the slots of each row are spaced from each other in a direction that is substantially transverse to the peripheral cutting edge of saw blade 10. Thus, the selection of slots for supporting the wear guides will determine the position of the wear guides and the contacts which those guides make with the saw blade. The selection of slots should be made to provide wear engagements nearest to the gullet line of the blade without making contact with the saw kerf.

Slots 28 are preferably shaped with a lower opening 28a that will receive the enlarged head 29a of support members 29. The upper or remainder portion 28b of each slot is restricted as to permit only the passage of the stem portion 29b of each support member after the enlarged head 29a has been received through the opening 28a. Keyways 28c are also formed in the wear surface of the guides to provide a recess of sufficient width to receive and house the enlarged heads 29a of the support members while the stem portions 29b project through the restricted portions of the slots.

Each wear guide is mounted upon a pair of support members by initially projecting heads 29a through a pair of openings 28a of selected slots. A slight downward movement of the wear guide will then bring the upper ends of engaged slots to rest upon stem portions 29b, thereby supporting and locking the wear guide to the support arm.

With reference to FIG. 7, support arm 27 is also provided with contacts similar to those provided on support arm 17 for maintaining the wear guides in spaced relationship to the lateral surfaces of the support arm. In that regard, a plurality of contacts 30 and a wear guide contact strip 31 project outwardly from the lateral face of each support arm. These contacts define the backing surface for maintaining the wear guides 25 and 26 in close proximity to the adjacent saw blade while simultaneously providing a passageway between the contacts through which the sawdust may gravitate from the work area.

Each of the contacts 30 are preferably formed with a downwardly and outwardly inclined camming surface 30a to facilitate the replacement and positioning of wear guides. These camming surfaces correspond to the surfaces 22a referred to in connection with the first embodiment described.

Support arm 27 also comprises a hub portion having a plurality of hardened contacts 33 which correspond in function to the previously described contacts 23. Here again, the combined lateral projection of abutting contacts on adjacent support arms will establish the required spacing for positioning the wear guides in close proximity to the saw blades. However, the pivotal movement of one support arm from its saw guiding position into a position that produces a misalignment of contacts allows the pivoted arm to be moved axially upon the support shaft 18. When the support arms are moved into saw guiding positions, the inclined surfaces 33a engage similar surfaces on adjacent support arms to cam the support arms apart and permit an alignment of contacts, as previously described.

Figure 9:
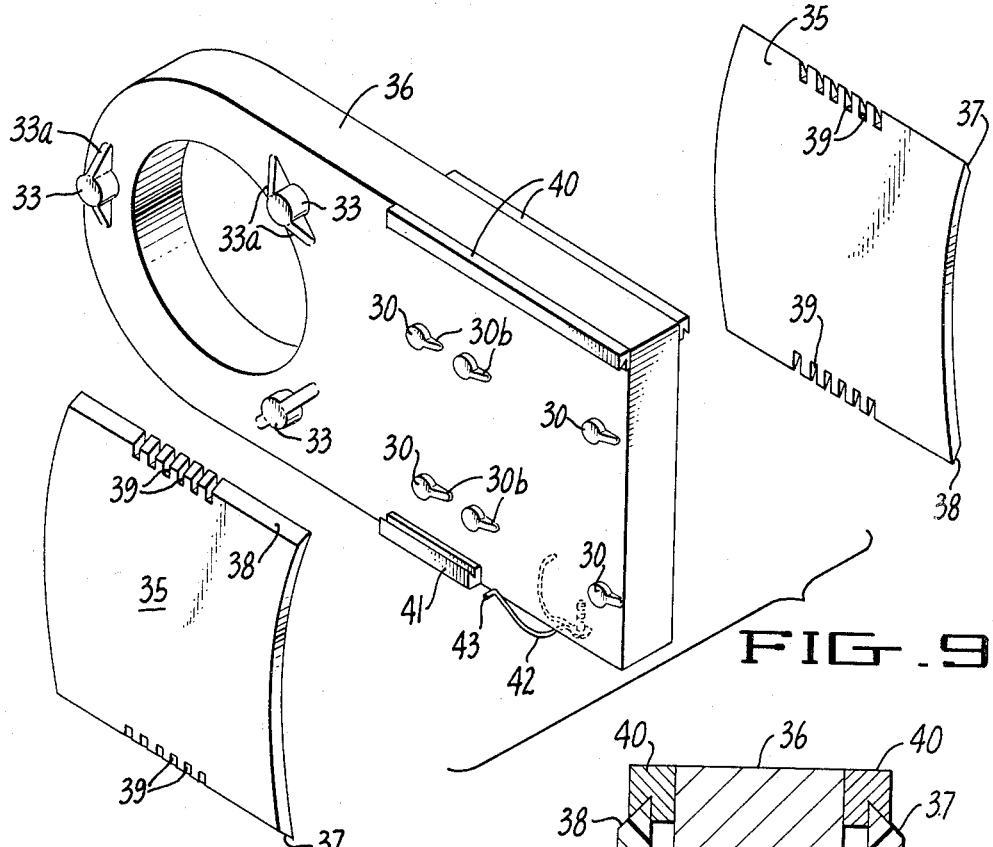
FIG. 9 is a perspective of another embodiment of wear guide and support arm, each wear guide being shown in exploded relation to the support arm.
Figure 10:
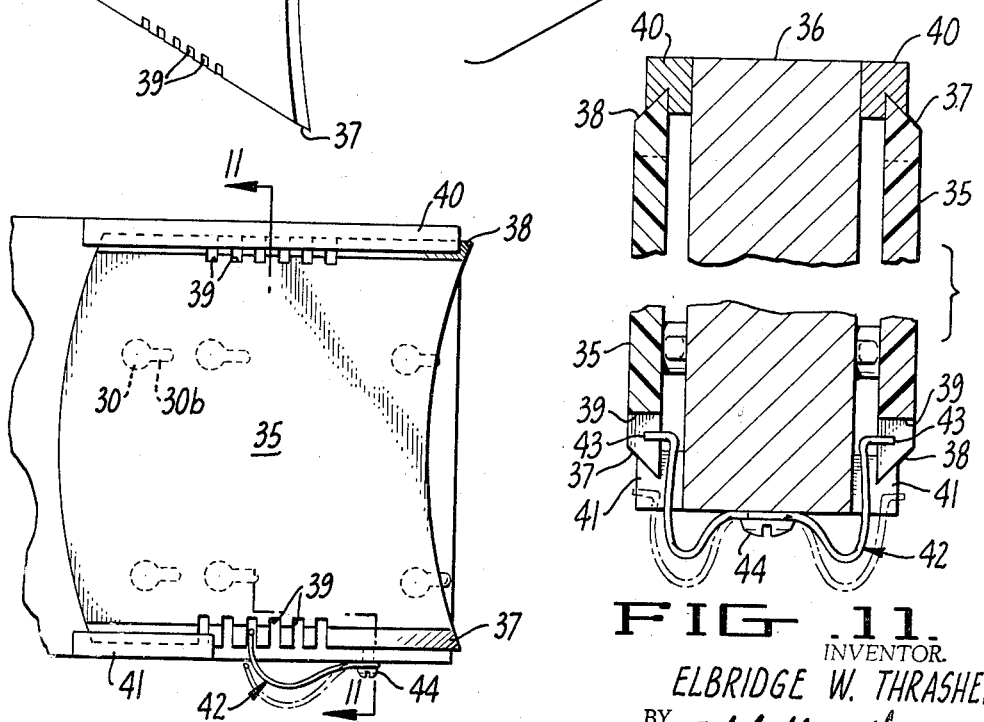
FIG. 10 is a side elevation of the embodiment shown in FIG. 9 showing the wear guides mounted upon the support arm.
Figure 11:
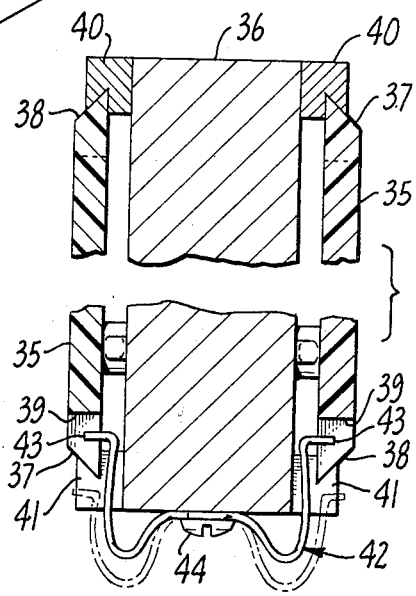
FIG. 11 is an enlarged fragmentary section taken on the broken line 11—11 of FIG. 10.

FIGS. 9, 10 and 11 illustrate a further embodiment of the invention comprising wear guides 35 that may be adjustably positioned on support arms 36 and used on either side thereof. Each wear guide 35 is formed with parallel upper and lower beveled edges 37 and 38, and a plurality of slots 39 are formed in each beveled edge. Wear guides 35 are supported between parallel upper and lower rails 40 and 41, respectively, each rail being formed with grooves that complement the beveled edges 37 and 38. It will also be apparent that rails 40 and 41 are spaced apart substantially the same distance as the beveled edges of the wear guides and together define a dovetail mounting.

Wear guides 35 are restrained from slidable movement between rails 40 and 41 by a spring clip 42 having a pair of fingers 43 engageable with the slots 39 of the lower beveled edge 37 and 38. Clip 42 is mounted to the lower surface of arm 36 by a screw 44. It will be evident that each finger 43 may be selectively engaged with any one of the slots 39 while the wear guide remains supported between rails 40 and 41.

In normal operation, wear guides 35 are mounted to support arms 36 by sliding them between a pair of rails 40 and 41 until the outermost guiding edge of the wear guide is positioned in proximate relation to the gullet line of a guided saw blade 10. This operation is accomplished, of course, only after fingers 43 are first moved downwardly into the broken line positions shown in FIGS. 10 and 11. The close proximity of the two fingers 43 of a given clip 42 permits simultaneous operation of both fingers by simply grasping the fingers between the thumb and forefinger of one hand.

The arrangement of contacts 30 and 33 is essentially the same as illustrated in FIGS. 6–8, and the purpose and function of these contacts is the same as has previously been described. It will be noted, however, that the inclined surface 30b of each contact 30 is aligned in a direction substantially parallel with rails 40 and 41, the direction in which each wear guide 35 is to be moved while being mounted to support arm 36.

It is to be understood that although preferred embodiments of the invention have been illustrated and described, various changes or modifications may be resorted to without departing from the spirit of the invention or the scope of the attached claims, and each of such changes or modifications is contemplated.

What is claimed is:

1. In a saw machine having a saw guide comprising a pair of support arms located on opposite sides of a saw blade and replaceable wear guides supported upon said arms, respectively, the improvement comprising contact means provided on each support arm for maintaining a supported wear guide in spaced relation to its supporting arm and defining spaces between the guide and support arm for receiving sawdust and providing a passageway for its removal.

2. The combination of claim 1 wherein said contact means comprises a wear guide contact that provides a continuous line of contact across the upper end of said wear guide to inhibit the passage of sawdust from a region above the wear guide into a region between said support arm and wear guide.

3. The combination of claim 1 wherein said contact means comprises a plurality of contacts mounted to each support arm, each contact providing a small area of contact with said wear guide relative to larger areas of space between contacts.

4. The combination of claim 3 and further wherein each of said contacts has an inclined surface extending in the direction in which the wear guide is mounted to its support arm.

5. The combination of claim 1 wherein said contact means comprises first wear guide contacts mounted to each support arm, respectively, each first wear guide contact providing a continuous line of contact across the upper end of said wear guide to inhibit the passage of sawdust from a region above the wear guide into a region between said support arm and wear guide; and a plurality of second contacts mounted to each support arm below said first wear guide contact, each second contact providing a small area of contact with said wear guide relative to larger areas of space between contacts.

6. The combination of claim 1 and further wherein each support arm comprises a hub pivotally mounted upon a connom axis, and a plurality of contacts mounted to each hub, the contacts of each being arranged to engage the contacts of the other when both support arms occupy saw guiding positions, a pivotal movement of one support arm resulting in a misalignment of contacts that permits relative axial movement of one support arm toward the other.

7. The combination of claim 6 and further wherein at least one contact mounted to a hub has an inclined surface extending outward from the face of the hub in a generally circumferential direction, the inclined surface providing an engagement for moving the support arms, implementing the alignment of contacts and shearing sawdust that may adhere to the faces of abutting contacts.

8. The combination of claim 1 and further comprising means for selectively mounting said wear guides upon their associated support arms to establish and maintain contacts near the gullet lines of saw blades of different sizes.

9. In a saw machine having a plurality of saws and saw guides, said saw guides comprising a plurality of support arms interdigitated with said saws and having replaceable wear guides supported upon opposite sides of each suport arm, respectively, each support arm having a hub pivotally mounted upon a common axis; the improvement wherein a plurality of contacts are mounted to each hub on both lateral faces thereof, the contacts of one side of each hub being arranged to engage the contacts of the adjacent hub when both support arms occupy saw guiding positions, a pivotal movement of one support arm resulting in a misalignment of contacts that permits relative axial movement of the one support arm in either direction.

10. The combination of claim 9 and further wherein at least one contact on each hub has an inclined surface extending outward from the face of the hub in a generally circumferential direction, the inclined surfaces providing engagements for moving the support arms relatively apart, implementing the alignment of contacts and shearing sawdust that may adhere to the faces of abutting contacts.

11. The combination of claim 9 and further comprising contact means provided on each support arm for mounting a supported wear guide in spaced relation to its supporting arm and defining spaces between the guide and support arm, respectively, for receiving sawdust and providing a passageway for its removal.

12. In a saw machine having a saw guide comprising a pair of support arms located on opposite sides of a saw blade and replaceable wear guides supported upon said arms, respectively, the improvement comprising means for selectively mounting said wear guides upon their associated support arms to establish and maintain contacts near the gullet lines of saw blades of different sizes.

13. The combination of claim 12 wherein said wear guides are formed with a plurality of spaced-apart slots, and a detent member mounted on said support arm, said slots being selectively engageable with said member for fixing the position of said wear guide.

14. The combination of claim 13 and further comprising a pair of rails, each rail having a groove therein, and wherein said wear guides are formed with beveled surfaces engageable with the grooves formed in said rails.

15. The combination of claim 13 wherein said slots are formed in the lower edge of each wear guide.

16. The combination of claim 13 wherein said slots are formed in both the lower and upper edges of each wear guide, said wear guide being symmetrical relative to a horizontal axis to permit its use as either a right or left hand guide.

17. The combination of claim 12 wherein said wear guides are formed with a plurality of spaced-apart slots, and further comprising at least two support members projecting from each support arm for selectively mounting said wear guides upon their associated support arm, said members being arranged in spaced relation complementary to the spacing of said slots and adapted to be received within certain of said slots for supporting said wear guides in several positions.

18. The combination of claim 17 wherein each support member comprises a stem portion and an enlarged head, and wherein each slot provides an opening at one end thereof for receiving the enlarged head of a supported member, the remainder portion of each slot being sufficiently wide to receive the stem portion of one support member but insufficient to permit passage of the enlarged head.

19. The combination of claim 18 wherein each wear guide is formed with keyways that extend from each slot opening, respectively, each keyway being sufficiently wide to receive and house the enlarged head of a support member while the stem portion of said member projects through the remainder portion of the slot.

References Cited

UNITED STATES PATENTS

| | | | |
|---|---|---|---|
| 335,319 | 2/1886 | Slocum | 143—160 X |
| 1,203,940 | 11/1916 | Trout | 143—165 |
| 2,606,578 | 8/1952 | Irwin et al. | 143—166 X |
| 2,760,531 | 8/1956 | Tommila | 143—160 |

HARRISON L. HINSON, Primary Examiner

U.S. Cl. X.R.

143—165